US009459658B1

(12) United States Patent
Lin et al.

(10) Patent No.: US 9,459,658 B1
(45) Date of Patent: Oct. 4, 2016

(54) MODULAR ELECTRONIC DEVICE

(71) Applicant: Quanta Computer Inc., Taoyuan (TW)

(72) Inventors: Yu-Yen Lin, Taoyuan (TW);
Cheng-Chang Hung, Taoyuan (TW);
Sheng-An Tsai, Taoyuan (TW);
Lu-Lung Tsao, Linkou Township, Taipei County (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/865,495

(22) Filed: Sep. 25, 2015

(30) Foreign Application Priority Data

Jul. 2, 2015 (TW) .............................. 104210706 U

(51) Int. Cl.
*G06F 1/16* (2006.01)

(52) U.S. Cl.
CPC ............ *G06F 1/1632* (2013.01); *G06F 1/1679* (2013.01)

(58) Field of Classification Search
CPC ..... G06F 1/1616; G06F 1/1679; G06F 1/187
See application file for complete search history.

(56) References Cited

U.S. PATENT DOCUMENTS

| | | | | |
|---|---|---|---|---|
| 3,751,127 A * | 8/1973 | Black, Jr. ............ | A47B 47/0041 | 312/111 |
| 5,829,987 A * | 11/1998 | Fritsch ................ | H01R 13/7037 | 200/51.09 |
| 6,166,917 A * | 12/2000 | Anderson ................ | G06F 1/186 | 361/752 |
| 6,188,573 B1 * | 2/2001 | Urita ...................... | G06F 1/1616 | 165/80.3 |
| 6,366,440 B1 * | 4/2002 | Kung ........................ | E05C 19/16 | 361/147 |
| 6,445,579 B1 * | 9/2002 | Singleton, Jr. ......... | G06F 1/1658 | 248/65 |
| 6,621,693 B1 * | 9/2003 | Potter ...................... | G06F 1/184 | 257/E23.099 |
| 6,795,314 B1 * | 9/2004 | Arbogast ............ | H05K 7/20172 | 165/104.33 |
| 6,922,333 B2 * | 7/2005 | Weng ..................... | G06F 1/1616 | 220/230 |
| 8,238,084 B2 * | 8/2012 | Chen ..................... | G06F 1/1616 | 361/679.14 |
| 2005/0167992 A1 * | 8/2005 | Lo ........................... | E05C 19/16 | 292/251.5 |
| 2005/0257232 A1 * | 11/2005 | Hidaka ................ | G11B 33/126 | 720/654 |
| 2006/0006674 A1 * | 1/2006 | Kang ...................... | E05C 19/16 | 292/251.5 |
| 2006/0250766 A1 * | 11/2006 | Blaalid ................... | G06F 1/187 | 361/679.33 |
| 2007/0053169 A1 * | 3/2007 | Carlson .................. | G11B 33/12 | 361/727 |
| 2007/0072443 A1 * | 3/2007 | Rohrbach .......... | H01R 13/6205 | 439/39 |
| 2007/0121303 A1 * | 5/2007 | Wang .................. | H04M 1/0222 | 361/752 |
| 2007/0133156 A1 * | 6/2007 | Ligtenberg ............ | G06F 1/1616 | 361/679.27 |
| 2008/0055417 A1 * | 3/2008 | Chou ................... | H04N 5/2254 | 348/207.99 |
| 2008/0232061 A1 * | 9/2008 | Wang ..................... | G06F 1/1632 | 361/679.41 |
| 2008/0285221 A1 * | 11/2008 | Imsand ................... | G06F 1/183 | 361/679.55 |
| 2009/0103261 A1 * | 4/2009 | Shih ........................ | E05C 19/16 | 361/679.58 |
| 2010/0238620 A1 * | 9/2010 | Fish ....................... | G06F 1/1616 | 361/679.09 |
| 2013/0107431 A1 * | 5/2013 | Xu .......................... | G06F 1/1616 | 361/679.01 |

* cited by examiner

*Primary Examiner* — Adrian S Wilson
(74) *Attorney, Agent, or Firm* — Rabin & Berdo, P.C.

(57) ABSTRACT

A modular electronic device includes a frame and a module disposed in the frame. The frame has a slot and a recess in the slot. The module is disposed in the slot. The module includes a casing, a rail component disposed in casing and having a rail, a push rod slid in the rail, a supporting piece connected to push rod, a magnetic component disposed on supporting piece, and a latching member disposed in casing. Magnetic component includes a first magnet and a second magnet having opposite magnetic directions. Latching member is made of magnetic material. Casing has an opening arranged facing frame. Magnetic component is moved relative to latching member when push rod is slid along rail component. Magnetic component provides a repulsion force to push latching member protruding from opening and engaging with recess or provides an attraction force to restore latching member being contained in casing.

10 Claims, 10 Drawing Sheets

MODULAR ELECTRONIC DEVICE

RELATED APPLICATIONS

This application claims priority to Taiwan Application Serial Number 104210706, filed Jul. 2, 2015, which is herein incorporated by reference.

BACKGROUND

1. Field of Invention

The present invention relates to an electronic device. More particularly, the present invention relates to a modular electronic device.

2. Description of Related Art

With the development of intelligent industry, the population using portable electronic devices as assistive devices, such as smart phones, or tablet computers, etc., in life is consistently increasing. These handheld devices have a small volume, are convenient to carry, and their functions become gradually complete as they develop. As a result, the population using portable electronic devices is consistently increasing, and portable electronic devices have become indispensable assistive devices in modern life.

However, due to the different functions desired by different users and the rapid development of science and technology, manufacturers usually need to keep launching products having different specifications or different main features. Not only is this phenomenon disadvantageous to manufacturers' stock, but the customization or environmentally friendly trend is not met.

For the forgoing reasons, there is a need to solve the above-mentioned problems by providing a modular electronic device.

SUMMARY

Therefore, the present invention provides a modular electronic device to satisfy the customization requirement and improve the reliability of the modular electronic device.

A modular electronic device is provided. The modular electronic device comprises a frame and a module disposed in the frame. The frame has a slot and a recess in the slot. The module is disposed in the slot. The module comprises a casing, a rail component disposed in the casing and having a rail, a push rod slid in the rail, a supporting piece connected to the push rod, a magnetic component disposed on the supporting piece, and a latching member disposed in the casing. The magnetic component comprises a first magnet and a second magnet having opposite magnetic directions. The latching member is made of a magnetic material. The casing has an opening arranged facing a surface of the frame. The magnetic component is moved relative to the latching member when the push rod is slid along the rail component. The magnetic component provides a repulsion force to push the latching member protruding from the opening and engaging with the recess or provides an attraction force to restore the latching member being contained in the casing.

In the foregoing, a cross-sectional shape of the casing is narrow on top and wide on bottom and a cross-sectional shape of a side wall of the slot is wide on top and narrow on bottom, such that the casing is fit into the side wall.

In the foregoing, the frame further comprises a magnetic sensing element disposed underneath the recess. The magnetic sensing element detects changes of a distribution density of magnetic field lines of the latching member.

In the foregoing, the first magnet provides the repulsion force to the latching member. The second magnet provides the attraction force to the latching member. The attraction force provided by the second magnet is greater than the repulsion force provided by the first magnet.

In the foregoing, the casing comprises a top cover and a bottom cover fit to each other. The opening is disposed in the bottom cover. The casing further comprises a retaining wall surrounding the opening.

In the foregoing, a side edge is formed between the opening and the retaining wall. The side edge supports the latching member to avoid that the latching member slips from the opening.

In the foregoing, a bottom of the latching member has a beveling edge. The side edge has a chamfer. The latching member enters into the opening with guidance of the chamfer and the beveling edge.

In the foregoing, the latching member is in a shape of T, in a shape of a trapezoid, or in a shape of a wedge.

In the foregoing, the casing further comprises another opening disposed in the top cover. The push rod and the rail are exposed from the top cover.

In the foregoing, the rail component comprises an elastic member having the rail disposed on the top cover and an elastic arm disposed in the rail.

The present invention provides a modular electronic device to allow users to select the modules based on their own needs and assemble the modules to the frame so as to satisfy the customization requirement. The modular electronic device controls the lifting or falling of the latching member by utilizing the magnetic force, such that the latching member is engaged with the recess of the frame to securely fix the module on the frame without slipping from the frame because of collision or being squeezed by an external force.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
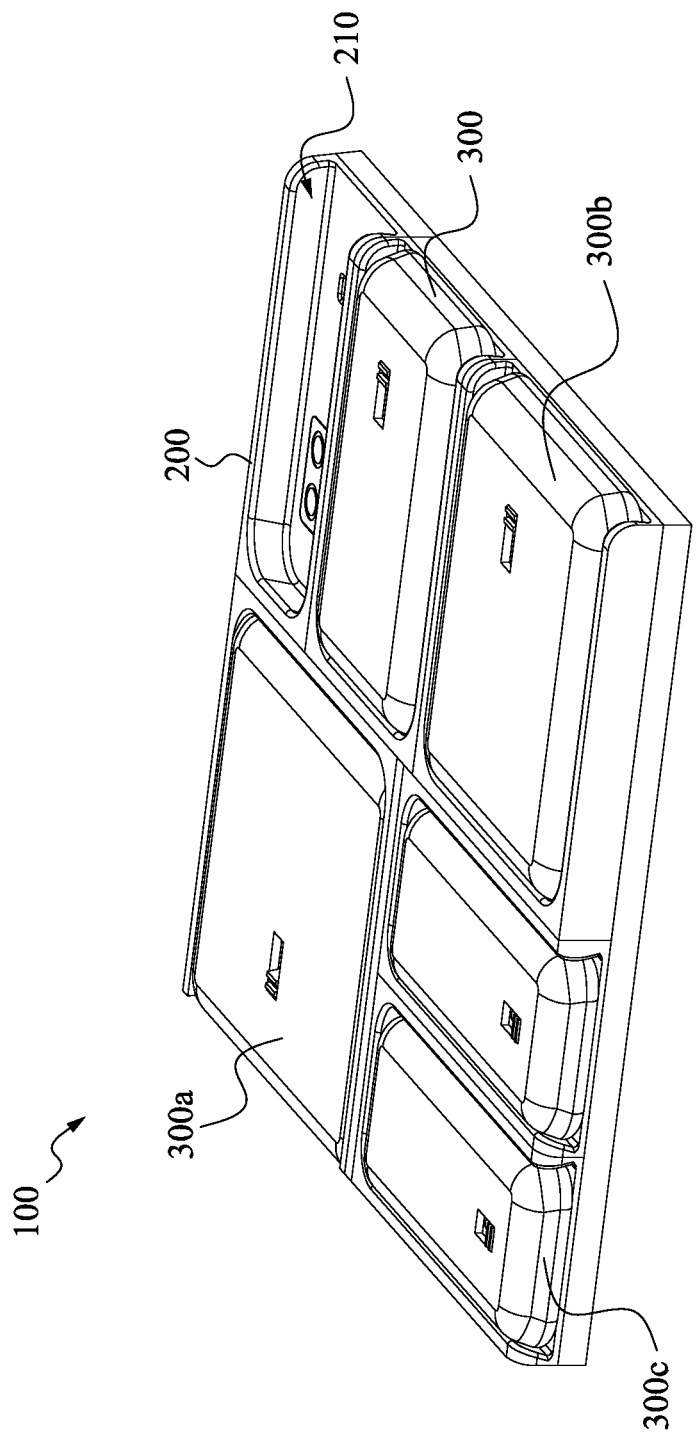
FIG. 1 is a top schematic diagram of a modular electronic device according to one embodiment of this application.

Reference will now be made in detail to the present embodiments of the invention, examples of which are illustrated in the accompanying drawings. Wherever possible, the same reference numbers are used in the drawings and the description to refer to the same or like parts. It is also to be understood that the detail description of the present embodiments is by examples and is intended to provide further explanation of the invention as claimed.

FIG. 1 is a top schematic diagram of a modular electronic device according to one embodiment of this application. A modular electronic device 100 comprises a frame 200 and a plurality of modules 300 assembled to one side or two sides of the frame 200 in a pluggable manner. The frame 200 comprises a plurality of slots 210 in various sizes. A size of each of the slots 210 and a size of the module 300 corresponding to the each of the slots 210 can be determined according to design specifications, such as a large-sized module 300a, a medium-sized module 300a, or a small-sized module 300c. To simplify matters, the modules 300 comprise the above or additional sizes in the disclosure as follows.

The different modules 300 have different functions, and the sizes of the modules 300 having different functions may be selected depending on design requirements. For example, a power module such as a battery requires a larger volume so that it can be designed as a large-sized module. Since the modules 300 are assembled to the frame 200 in a pluggable manner, users are allowed to select the modules 300 based on their own needs when purchasing electronic products, such as smart phones or tablet computers. In this manner, the cost is saved and the customization requirement is met.

For example, a display module or a touch display module may be disposed at one side of the frame 200, which can be assembled to the frame 200 in a fixed manner or a pluggable manner. Another side of the frame 200 has the plurality of slots 210. The modules 300 are assembled in the slots 210 in a pluggable manner.

Basic components of the frame 200 may comprise but not limited to a communication module and a spare battery. Other components, such as a screen, a battery, a lens, etc. are provided in a modularized form. Hence, in addition to provide devices of different grades or different specifications, many seldom used functions can be selected depending on needs after constituent devices of the electronic device are modularized. For example, if there is a patient or an elderly person at home, a health monitoring module can be purchased. Or, a three-dimensional (3D) camera module can be used together with the electronic device to capture three-dimensional pictures.

However, since the modular electronic device 100 needs to be carried, a volume and a weight of the modular electronic device 100 are limited. Hence, how to securely fix the modules 300 on the frame 200 in a limited space without slipping from the frame 200 due to collision or being squeezed is thus a problem that the present invention intends to resolve.

Figure 2A:
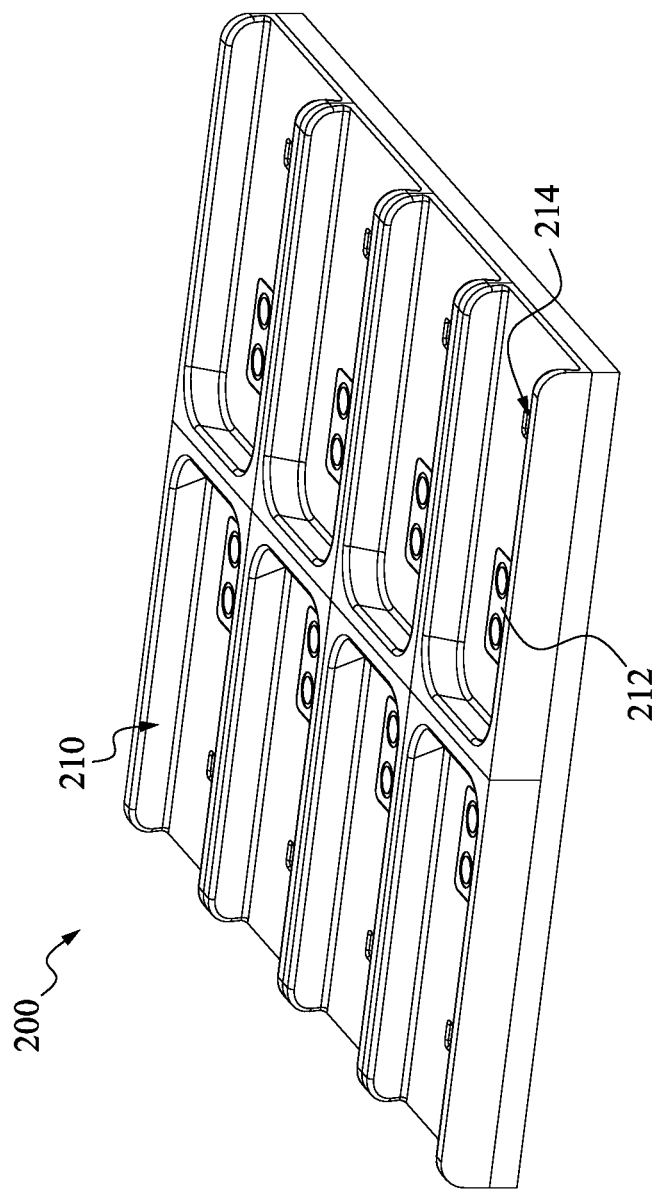
FIG. 2A is an oblique views of a frame of a modular electronic device according to one embodiment of this application.
Figure 2C:
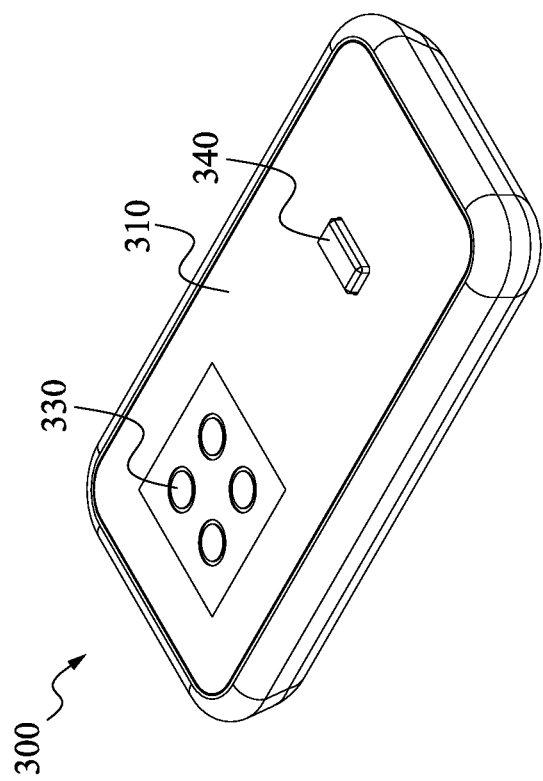
FIG. 2B and FIG. 2C are oblique views of a module of a modular electronic device respectively viewed from different angles according to one embodiment of this application.
Figure 2B:
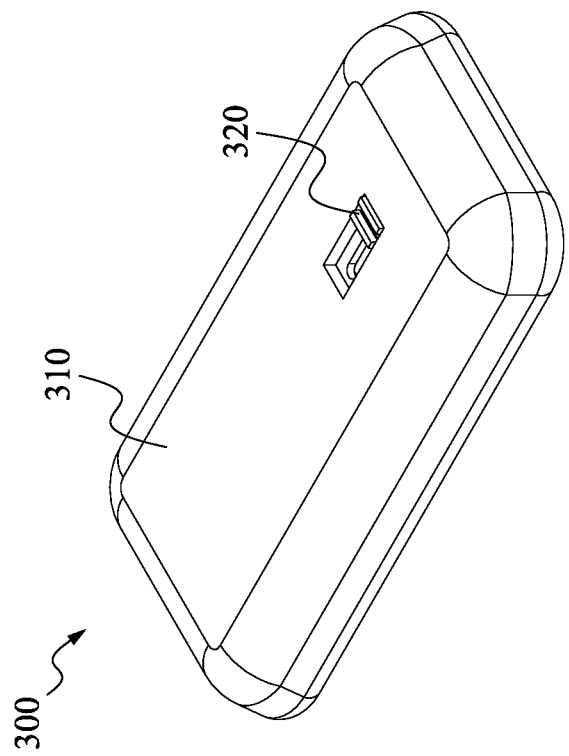

A description is provided with reference to FIG. 2A to FIG. 2C. FIG. 2A is an oblique views of a frame of a modular electronic device according to one embodiment of this application. FIG. 2B and FIG. 2C are oblique views of a module of a modular electronic device respectively viewed from different angles according to one embodiment of this application. The frame 200 has the plurality of slots 210 having a same size or different sizes. A connector 212 and a recess 214 are disposed on each of the slots 210. The module 300 comprises a casing 310, a push rod 320 exposed from an upper surface of the casing 310, and contact terminals 330 and a latching member 340 exposed from a lower surface of the casing 310. When a user intends to assemble the module 300 to the frame 200, the module 300 is pushed to a position, such that the latching member 340 falls into the recess 214. As a result, the module 300 is not easily separated from the frame 200. At this time, the contact terminals 330 of the module 300 are able to connect with the connector 212 of the frame so as to realize signal exchange and/or electric power transmission.

The module 300 may have a single function or an integrated function. The sizes of the modules 300 and positions of the contact terminals 330 may be designed according to specifications. The module 300, for example, may be a processing module, a lens module, a physiological signal monitoring module, or a battery module, etc., but the present invention is not limited in this regard.

Figure 3:
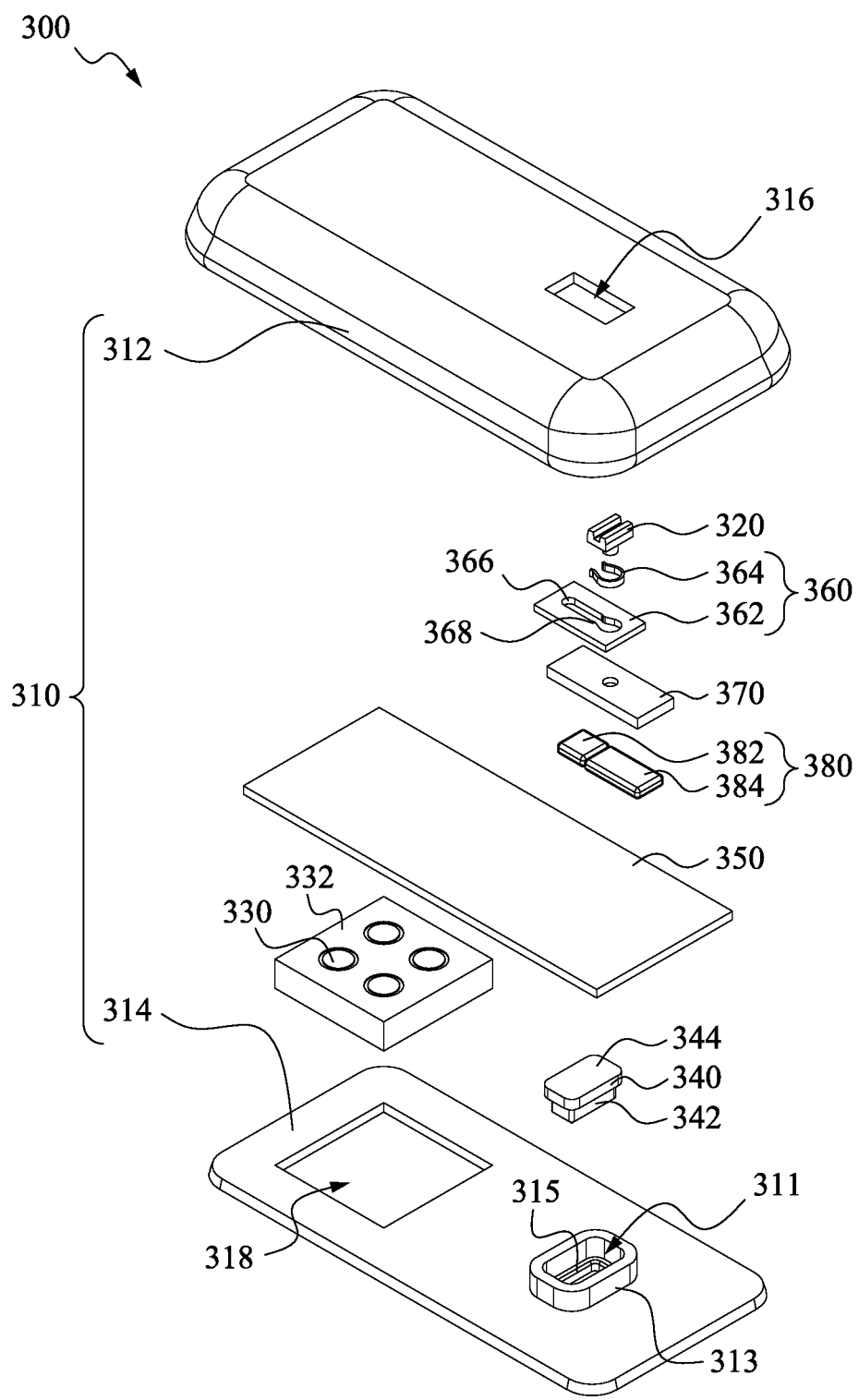
FIG. 3 is an exploded view of the module in FIG. 2B according to one embodiment.

A description is provided with reference to FIG. 3. FIG. 3 is an exploded view of the module in FIG. 2B according to one embodiment. The casing 310 of the module 300 comprises a top cover 312 and a bottom cover 314. The top cover 312 and the bottom cover 314 are assembled to each other to constitute the casing 310, and define an accommodation room in the casing 310. The module 300 further comprises the push rod 320, a connector 332, the latching member 340, a main board 350, a rail component 360, a supporting piece 370, and a magnetic component 380 disposed in the accommodation room.

The main board 350 comprises a circuit board and a processor or some other electronic elements disposed on the circuit board. The connector 332 is disposed on the main board 350 and located between the main board 350 and the bottom cover 314. The bottom cover 314 has an opening 318 to allow the contact terminals 330 of the connector 332 to be exposed from the bottom cover 314. The contact terminals 330 are thus able to be connected with the connector 212 on the frame through the opening 318 so as to connect the main board 350 and the frame 200.

The supporting piece 370 is located between the top cover 312 and the main board 350. The supporting piece 370 may be a hard substrate, such as a plastic substrate. The magnetic component 380 is disposed on a surface of the supporting piece 370 facing the main substrate 350. The magnetic component 380 comprises a first magnet 382 and a second magnet 384 having opposite magnetic directions (opposite polarities). The push rod 320 is disposed on a surface of the supporting piece 370 facing the top cover 312. The push rod 320 and the supporting piece 370 may be combined through engaging, adhesive bonding, or screw tightening, etc. The top cover 312 has at least one opening 316 to allow the push rod 320 or some other electronic element, such as a lens, to be exposed from the opening 316.

The rail component 360 is assembled to a surface of the top cover 312 facing the main board 350 and disposed in the opening 316. The rail component 360 comprises an elastic member 362 and an elastic arm 364. The elastic member 362 has a rail 366 in it. The elastic arm 364 is assembled in the rail 366. A path of the rail 366 approximately overlaps the opening 316 to allow the push rod 320 to move along the rail 366 in the opening 316. The push rod 320 will lead the supporting piece 370 and the magnetic component 380 connected to it to move in the casing 310.

The latching member 340 is made of a magnetic material able to be attracted or repulsed by a magnetic force, such as a magnet having a fixed polarity. The latching member 340 is located between the magnetic component 380 and the bottom cover 314. In greater detail, the bottom cover 314 has another opening 311 corresponding to a position of the push rod 320, and an upright retaining wall 313 standing on the bottom cover 314 and surrounding the opening 311. A slight distance is retained between the opening 311 and the retaining wall 313 to form a side edge 315 within the retaining wall 313. The latching member 340 is disposed at an inner edge of the retaining wall 313 and supported by the side edge 315. A shape of the latching member 340 is wide on top and narrow on bottom, such as in a shape of T, in a shape of a trapezoid, or in a shape of a wedge. A size of a bottom 342 of the latching member 340 is smaller than a size of the opening 311 and a size of a top 344 of the latching member 340 is larger than the size of the opening 311, such that the bottom 342 of the latching member 340 can protrude from the opening 311 and the latching member 340 will not slip from the opening 311.

A description of a method for assembling the module 300 and the frame 200 is provided with reference to FIG. 4A to FIG. 4E. FIG. 4A to FIG. 4E depict cross-sectional views of detaching a module from a frame and assembling the module in the frame respectively at different stages in a modular electronic device according to this application. To simplify matters, the following figures only depict that the single module 300 is detached from and assembled in the slot 210 of the frame 200.

A description is first provided with reference to FIG. 4. The module 300 is slid along the slot 210 of the frame 200. In greater detail, the module 300 is slid into the slot 210 along the slot 210 from an outside to an inside of the slot 210. At this time, the push rod 320 is located at one end of the rail 366 to allow the second magnet 384 of the magnetic component 380 to attract the latching member 340 made of the magnetic material. The latching member 340 is thus retained in an inner side of the casing 310 without protruding from the casing 310.

Figure 4A:
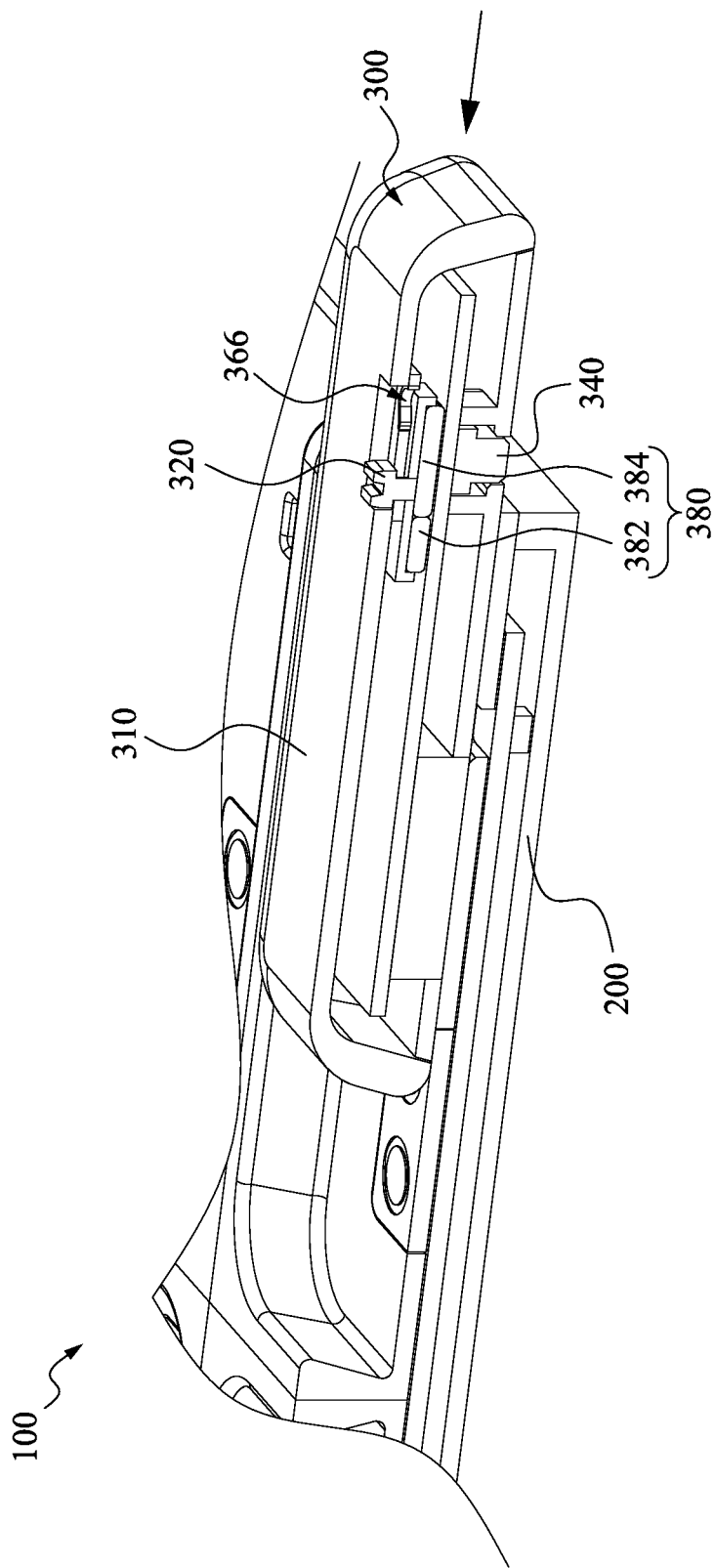
FIG. 4A to FIG. 4E are cross-sectional views of detaching a module from a frame and assembling the module in the frame respectively at different stages in a modular electronic device according to this application.
Figure 4B:
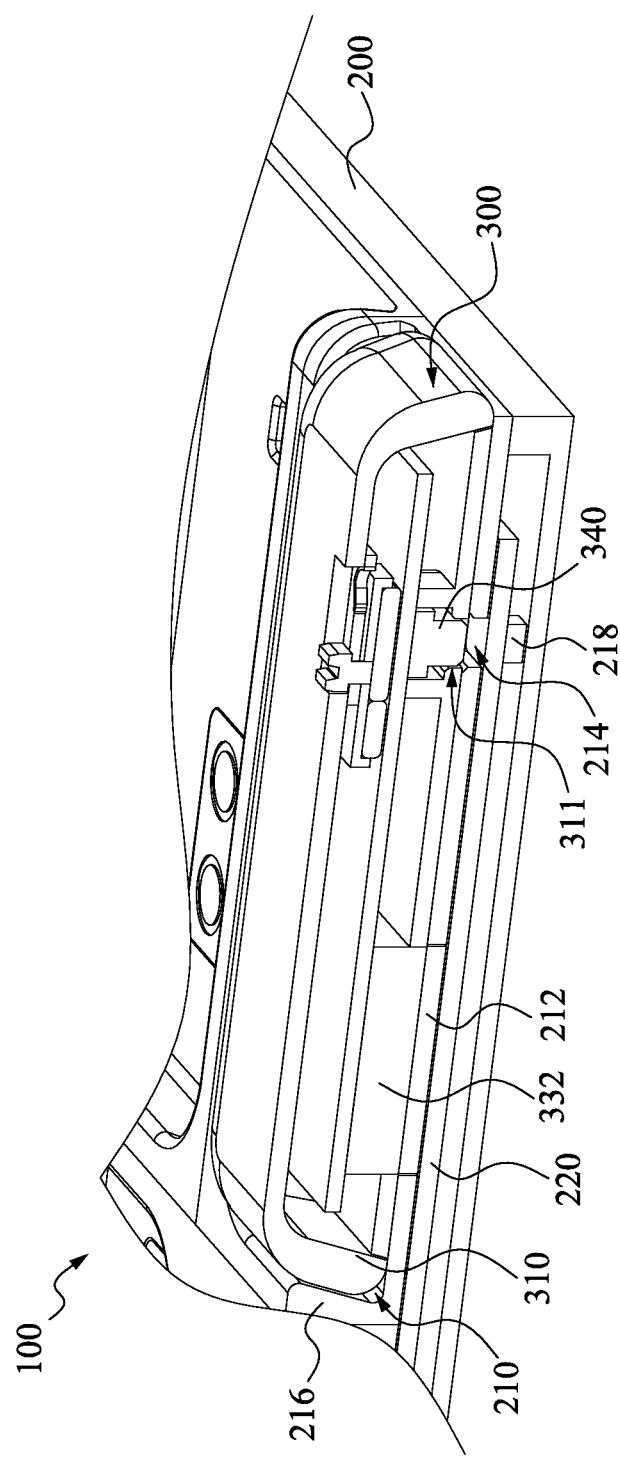

A description is then provided with reference to FIG. 4B. The module 300 is kept sliding along the slot 210 until one end of the module 300 abutting against one end of the slot 210. A cross-sectional shape of the casing 310 of the module 300 is approximately narrow on top and wide on bottom and a cross-sectional shape of a side wall 216 of a bottom of the slot 210 is wide on top and narrow on bottom, such that the casing 310 of the module 300 is fit into the side wall 216 of the slot 210 to avoid a vertical displacement of the module 300 relative to the frame 200. However, the cross-sectional shape of the casing 310 of the module 300 and the cross-sectional shape of the bottom of the side wall 216 of the bottom of the slot 210 are not limited in this regard.

At this time, the contact terminals 330 of the connector 332 exposed from a bottom of the module 300 (see FIG. 2C) will contact the connector 212 in the slot 210 of the frame 200 so as to realize electrical connections between the module 300 and the components of the frame 200 or between the module 300 and the other modules 300. When the module 300 is slid to a predetermined position, the latching member 340, the opening 311, and the recess 214 are approximately aligned.

The frame 200 further comprises a magnetic sensing element 218 disposed underneath the recess 214. The magnetic sensing element 218 is configured to detect changes of magnetic field lines. In greater detail, the magnetic sensing element 218 is configured to detect whether the latching member 340 made of the magnetic material is approaching or away from the magnetic sensing element 218, and a signal is transmitted to the main board 350 or a processor 220 in the frame 200 by using a wired or wireless method to determine the position of the module 300.

Figure 4C:
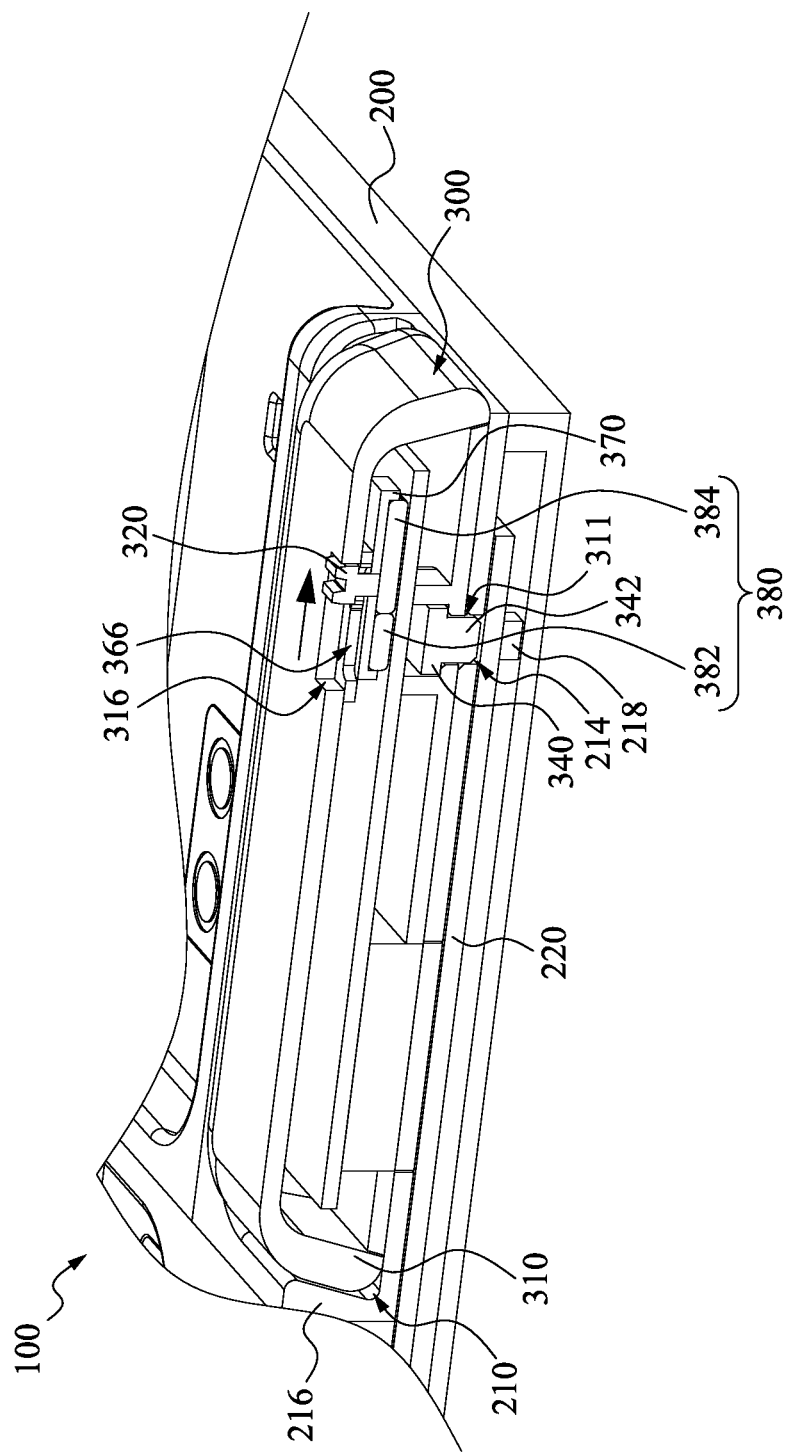

After that, as shown in FIG. 4C, the push rod 320 exposed from the opening 316 is pushed to allow the push rod 320 to move from the one end to another end of the rail 366 and lead the supporting piece 370 and the magnetic component 380 connected to it to move. At this time, the first magnet 382 is above the latching member 340. Since the first magnet 382 and the second magnet 384 have opposite magnetic directions, the latching member 340 originally attracted by magnetic force will be repulsed by magnetic force so that the latching member 340 falls down to allow the bottom 342 of the latching member 340 to protrude from the opening 311 so as to engage with the recess 214. Hence, a horizontal displacement of the module 300 is also limited. With the cooperation of the side wall 216 of the frame which fitting the casing 310, the module 300 is able to be fixed in the slot 210 without slipping from the slot 210 because of collision or being squeezed.

When the magnetic sensing element 218 senses that a distribution density of the magnetic field lines changes from weak to strong, the module 300 has been assembled in the frame 200 and the module 300 is ready to use. At this time, the processor 220 in the frame 200 can transmit a signal to activate the module 300.

Figure 4D:
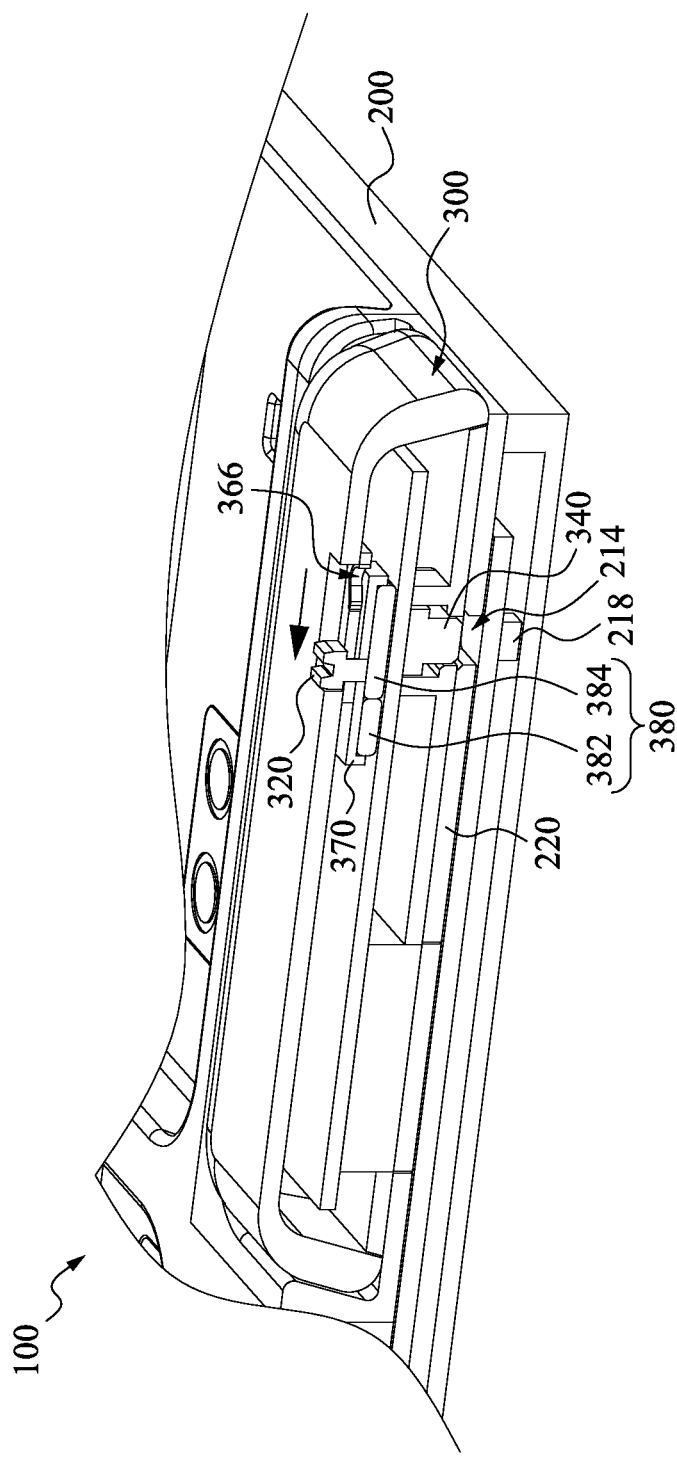

A description is provided with reference to FIG. 4D. Then, when the module 300 needs to be taken out, users can once again pull the push rod 320 to allow the push rod 320 to return to the end from another end of the rail 366. The push rod 320 will once again lead the supporting piece 370 and the magnetic component 380 connected to it to move relative to the latching member 340 so the second magnet 384 is located above the latching member 340. Since the second magnet 384 will attract the latching member 340, the latching member 340 will be pulled up. As a result, the latching member 340 is separated from the recess 214 and is restored to being contained in the casing 310.

At this time, the distribution density of the magnetic field lines sensed by the magnetic sensing element 218 in the frame 200 will change from strong to weak. A signal correspondingly transmitted will inform the module 300 or the processor 220 in the frame 200 that the module 300 is going to be removed. The power of the module is cut off first to protect the module 300 which may not have the hot swap function.

Figure 4E:
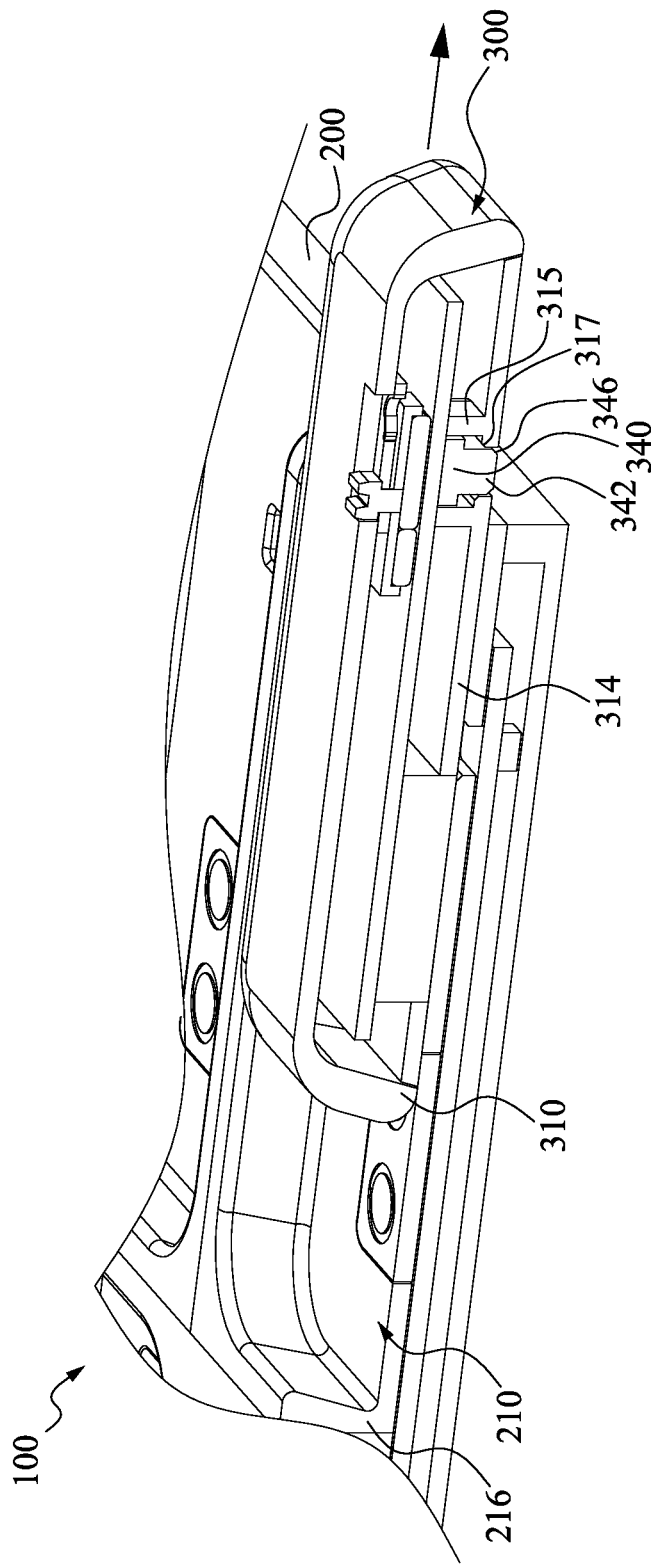

Finally, as shown in FIG. 4E, the module 300 can once again be slid along the slot 210 from the inside to the outside of the slot 210 to allow the casing 310 of the module 300 to be separated from the side wall 216 of the slot 210. The module 300 can thus be taken out from the frame 200.

A detailed flow for detaching the module 300 from the frame 200 and assembling the module 300 in the frame 200 has been provided above. A description is provided with reference to FIG. 4E and FIG. 3 for a detailed introduction to the elements in the module 300.

In some embodiments, the elastic member 362 of the rail component 360 is made of a material able to generate a slight deformation, such as rubber. A shape of the rail 366 may be wider at one end and narrower and elongated at another end. The rail 366 has a neck area 368 in a middle position which has a reduced width to generate hand feeing when the push rod 320 passes through the neck area 368. In addition, a position of the neck area 368 can be designed to prompt a current position of the magnetic component 380. For example, when the push rod 320 passes through the neck area 368, the first magnet 382 above the latching member 340 is switched to the second magnet 384, and vice versa. The elastic arm 364 disposed in the rail 366 can further be used to fix the push rod 320 so as to avoid the random sliding of the push rod 320 in the rail 366.

Not only are the magnetic directions of the first magnet 382 and the second magnet 384 in the magnetic component 380 opposite to each other, sizes of the first magnet 382 and the second magnet 384 are also different. In greater detail, the second magnet 384 used for attracting the latching member 340 has a larger size and the first magnet 382 used for repulsing the latching member 340 has a smaller size, such that the attraction force is greater than the repulsion force. The magnetic component 380 thus has a sufficient attraction force to attract the latching member 340 and avoids the situation that the latching member 340 is influenced by the attraction force and the repulsion force simultaneously and cannot move.

The latching member 340 not only has the wide top and the narrow bottom but also a beveling edge 346 at the bottom 342. The side edge 315 of the bottom cover 314 has a chamfer 317 correspondingly. As a result, even when some position deviation exists between the latching member 340 and the opening 311, the latching member 340 still can protrude from the opening 311 with guidance of the beveling edge 346 and the chamfer 317.

The retaining wall 313 located on the bottom cover 314 can be used for defining a range of action of the latching member 340 so that the latching member 340 will not move along the horizontal direction together with the magnetic component 380. Rather, the latching member 340 can only move up and down inside the retaining wall 313. In addition, the retaining wall 313 can further prevent the problem that the latching member 340 reverses when the magnetic direction received by the latching member 340 changes.

In other embodiments, in order to maintain the appearance integrity of the module 300, the push rod 320 and the rail component 360 can even been hidden in the casing 310. For example, through directly attracting the magnetic component 380 by an external magnet, the magnetic component 380 is dragged to move in the casing 310 so as to switch a position of the magnetic component 380. Similarly, the push rod 320 and the rail component 360 can provide the positioning function.

Figure 5C:
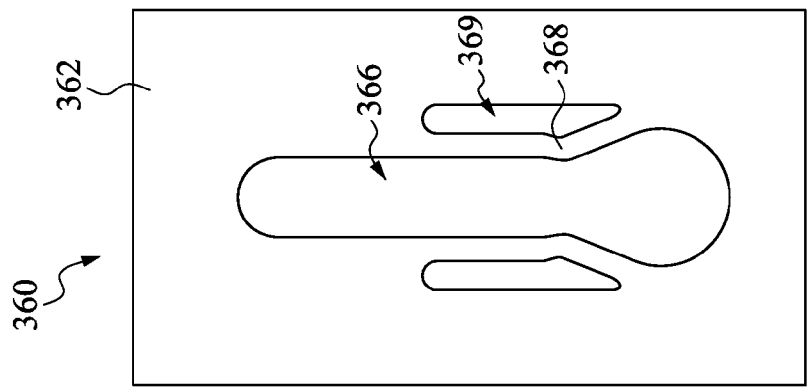
FIG. 5A to FIG. 5C depict top views of a rail component in a modular electronic device respectively according to various embodiments of this application.
Figure 5B:
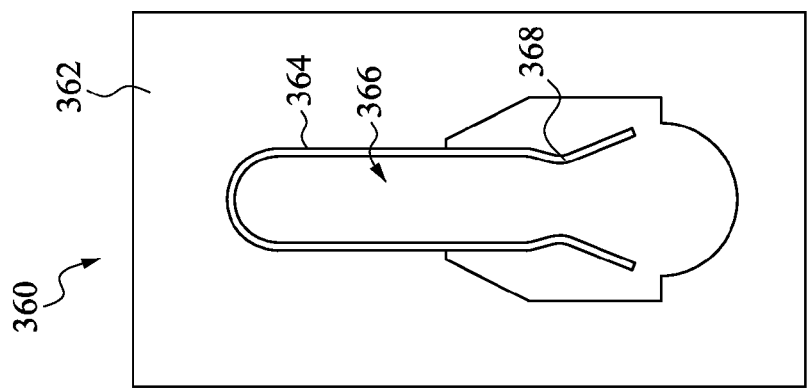
Figure 5A:
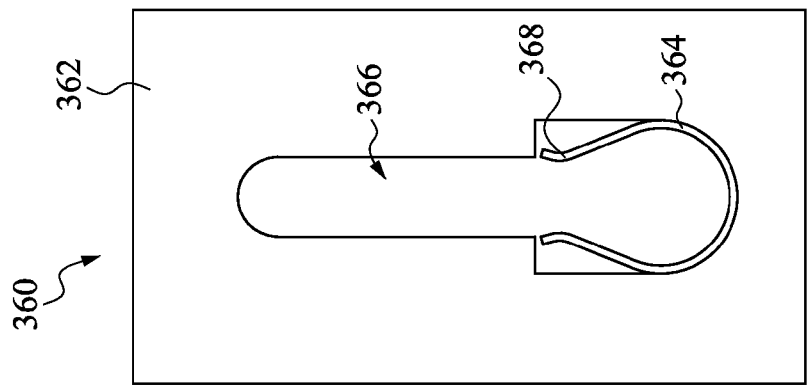

A description is provided with reference to FIG. 5A to FIG. 5C. FIG. 5A to FIG. 5C depict top views of a rail component in a modular electronic device respectively according to various embodiments of this application. As shown in FIG. 5A, one end of the rail 366 of the elastic member 362 is wider and another end of the rail 366 of the elastic member 362 is narrower and elongated. The elastic arm 364 may be disposed at the one end of the rail 366 that is wider. The elastic member 364 is approximately in a shape of C. An opening of the elastic arm 364 is approximately aligned with the neck area 368 of the rail 366.

Or, as shown in FIG. 5B, the elastic arm 364 is disposed at another end of the rail 366 that is narrower and elongated. The neck area 368 may be disposed in the elastic arm 364. Or, in other embodiments, the elastic member 362 may be made of a material having high hardness as shown in FIG. 5C. Under the circumstances, the elastic arm can be omitted. Rather, two sides of the rail 366 corresponding to the neck area 368 have slits 369 to allow the neck area 368 to provide the hand feeing when the push rod 320 passes through the neck area 368 and allow the slits 369 to provide room required by a deformation of the neck area 368.

In summary, the present invention provides a modular electronic device to allow users to select the modules based on their own needs and assemble the modules to the frame so as to satisfy the customization requirement. The modular electronic device controls the lifting or falling of the latching member by utilizing the magnetic force, such that the latching member is engaged with the recess of the frame to securely fix the module on the frame without slipping from the frame because of collision or being squeezed by an external force.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this application provided they fall within the scope of the following claims and their equivalents.

What is claimed is:

1. A modular electronic device comprising:
a frame having a slot and a recess in the slot; and
a module disposed in the slot, the module comprising:
a casing;
a rail component disposed in the casing and having a rail;
a push rod slid in the rail;
a supporting piece connected to the push rod;
a magnetic component disposed on the supporting piece, the magnetic component comprising a first magnet and a second magnet having opposite magnetic directions; and
a latching member made of a magnetic material disposed in the casing, the casing having an opening arranged facing a surface of the frame, the magnetic component being moved relative to the latching member when the push rod is slid along the rail component, the magnetic component providing a repulsion force to push the latching member protruding from the opening and engaging with the recess or providing an attraction force to restore the latching member being contained in the casing.

2. The modular electronic device of claim 1, wherein a cross-sectional shape of the casing is narrow on top and wide on bottom and a cross-sectional shape of a side wall of the slot is wide on top and narrow on bottom, such that the casing is fit into the side wall.

3. The modular electronic device of claim 1, wherein the frame further comprises a magnetic sensing element disposed underneath the recess, the magnetic sensing element detects changes of a distribution density of magnetic field lines of the latching member.

4. The modular electronic device of claim 1, wherein the first magnet provides the repulsion force to the latching member, the second magnet provides the attraction force to the latching member, the attraction force provided by the second magnet is greater than the repulsion force provided by the first magnet.

5. The modular electronic device of claim 1, wherein the casing comprises a top cover and a bottom cover fit to each other, the opening is disposed in the bottom cover, the casing further comprises a retaining wall surrounding the opening.

6. The modular electronic device of claim 5, wherein a side edge is formed between the opening and the retaining wall, the side edge supports the latching member to avoid that the latching member slips from the opening.

7. The modular electronic device of claim 6, wherein a bottom of the latching member has a beveling edge, the side edge has a chamfer, the latching member enters into the opening with guidance of the chamfer and the beveling edge.

8. The modular electronic device of claim 1, wherein the latching member is in a shape of T, in a shape of a trapezoid, or in a shape of a wedge.

9. The modular electronic device of claim 5, wherein the casing further comprises another opening disposed in the top cover, the push rod and the rail are exposed from the top cover.

10. The modular electronic device of claim 9, wherein the rail component comprises an elastic member having the rail disposed on the top cover and an elastic arm disposed in the rail.

\* \* \* \* \*